United States Patent [19]
Fujimori et al.

[11] Patent Number: 6,160,569
[45] Date of Patent: Dec. 12, 2000

[54] IMAGE FORMING APPARATUS CAPABLE OF CHANGING PROCESS LINE SPEED

[75] Inventors: Kota Fujimori; Takayuki Maruta, both of Yokohama, Japan

[73] Assignee: Ricoh Company, Ltd., Tokyo, Japan

[21] Appl. No.: 09/294,347

[22] Filed: Apr. 20, 1999

[30] Foreign Application Priority Data

| Apr. 20, 1998 | [JP] | Japan | 10-125302 |
| Jul. 27, 1998 | [JP] | Japan | 10-210922 |
| Sep. 8, 1998 | [JP] | Japan | 10-253645 |

[51] Int. Cl.$^7$ ............................................. B41J 2/435
[52] U.S. Cl. .................. 347/262; 347/264; 347/228; 399/50; 399/53
[58] Field of Search .................... 347/262, 228, 347/264; 399/46, 47, 48, 49, 51, 66, 53, 159, 50

[56] References Cited

U.S. PATENT DOCUMENTS

| 5,212,560 | 5/1993 | Yoshihiro et al. | 358/300 |
| 5,237,369 | 8/1993 | Maruta et al. | 399/49 |
| 5,270,783 | 12/1993 | Bisaiji et al. | 399/62 |
| 5,293,198 | 3/1994 | Sawayama et al. | 399/49 |
| 5,298,944 | 3/1994 | Sawayama et al. | 399/49 |
| 5,398,101 | 3/1995 | Takada et al. | 399/43 |
| 5,424,809 | 6/1995 | Sawayama et al. | 399/56 |
| 5,568,227 | 10/1996 | Wong | 399/16 |
| 5,630,195 | 5/1997 | Sawayama et al. | 399/49 |
| 5,761,570 | 6/1998 | Sawayama et al. | 399/49 |
| 5,781,826 | 7/1998 | Inomata | 399/53 |
| 5,860,038 | 1/1999 | Kato et al. | 399/49 |
| 6,029,034 | 2/2000 | Itsukushima et al. | 399/159 |

FOREIGN PATENT DOCUMENTS

| 0 500 134 | 8/1992 | European Pat. Off. . |
| 0 804 014 | 10/1997 | European Pat. Off. . |
| 0 851 312 | 7/1998 | European Pat. Off. . |
| 61-59368 | 3/1986 | Japan . |
| 5-66684 | 3/1993 | Japan . |

*Primary Examiner*—N. Le
*Assistant Examiner*—Hai C. Pham
*Attorney, Agent, or Firm*—Oblon, Spivak, McClelland, Maier & Neustadt, P.C.

[57] ABSTRACT

An image is generated by exposing the surface to a scanning laser beam in accordance with an image forming process. The intermediate image transfer member receives the image from the image carrying member and transfers it onto a recording sheet. A memory stores a plurality of values of process line speeds A for defining a speed of an image forming process in a sub-scanning direction, and a plurality of values of process line speeds B for defining a speed of the image transfer process. According to another aspect, a sensor detects a voltage of the photoconductor, a sensor detects an amount of toner deposition on the photoconductor member, a charging member provides a charge onto the photoconductor, a grid adjusting member controls a grid voltage of the charging member, a laser exposure unit exposes the photoconductor to a laser beam, an exposure adjusting member adjusts an amount of a laser beam exposure, and a development gamma detect member detects a development gamma line by performing a sequential operation. A controller detects the voltage of the photoconductor rotating in each of the process line speeds and determines optimum values of the grid voltage of the charging member and the amount of laser beam exposure from the laser exposure unit to obtain the respective required voltage level used by the grid adjusting member, and the after-exposure voltage used by the exposure adjusting member, on the basis of the detected voltage and with reference to information included in a reference table.

18 Claims, 10 Drawing Sheets

| | DEVELOPMENT POTENTIAL (V) | CHARGE LEVEL ($V_D$) | LATENT IMAGE CHARGE LEVEL ($V_L$) | DEVELOPMENT BIAS ($V_B$) |
|---|---|---|---|---|
| 1 | 500 | 900 | 300 | 800 |
| 2 | 480 | 870 | 290 | 770 |
| 3 | 460 | 840 | 280 | 740 |
| 4 | 440 | 810 | 270 | 710 |
| 5 | 420 | 780 | 260 | 680 |
| 6 | 400 | 750 | 250 | 650 |
| 7 | 380 | 720 | 240 | 620 |
| 8 | 360 | 690 | 230 | 590 |
| 9 | 340 | 660 | 220 | 560 |
| 10 | 320 | 630 | 210 | 530 |

*FIG. 10*

IMAGE FORMING APPARATUS CAPABLE OF CHANGING PROCESS LINE SPEED

BACKGROUND OF THE INVENTION

1. Field of the Invention

This invention relates to an image forming apparatus, and more particularly to an image forming apparatus which is capable of changing process line speeds for image forming and image transfer operations in accordance with image forming conditions.

This invention also relates to an image forming apparatus which is capable of changing a process line speed of a photoconductor in accordance with user desires for speed and quality in image forming.

2. Discussion of the Background

In an electrophotographic image forming apparatus, there have been proposed several methods for changing the image resolution with a single image forming mechanism. In one method, the image resolution is changed by varying a writing density with a laser beam and a rotation speed of a photoconductive drum while maintaining a rotation speed of a polygon motor unchanged. The image resolution can be changed also by changing a rotation speed of the polygon motor. Specifically, a relatively high image resolution can be obtained by a relatively high speed rotation of the polygon motor. However, an increase of the rotation speed of the polygon motor may require a great deal of structural modification with respect to the polygon motor, causing a relatively high cost increase. Therefore, the rotation speed of the polygon motor is generally controlled to be unchanged.

For example, Japanese Open-Laid Patent Publication No. JPAP01-224780 (1989) describes a technique which varies a density of data writing with a laser beam in accordance with the image resolution and also varies a process line speed in accordance with a change of the density. Further, this technique varies, in accordance with a change of the process line speed, conditions for various factors such as a latent image forming, development, image transfer, image fixing, and so forth.

On the other hand, several methods have been provided for changing a first process speed which is used in an image forming operation and a second process speed which is used in image transfer and fixing operations. One method is provided to avoid an insufficient image fixing operation. More specifically, in an image forming apparatus which uses an intermediate image transfer member, different color images are overlaid one after anther on an intermediate image transfer member in synchronism with a predetermined register mark provided to the intermediate image transfer member. After a completion of such an overlaying operation, the intermediate image transfer member transfers an entire image formed by overlaid images onto a recording sheet. In this image forming operation, if a non-ordinary sheet such as a relatively thick sheet, an OHP (Overhead Projector) sheet, or the like is used as a recording sheet, heat is absorbed by the thick recording sheet and the image transfer efficiency may therefore be reduced. In order to avoid this insufficient fixing operation, the above-mentioned method changes the second process line speed.

For example, Japanese Laid-Open Patent Publication No. JPAP04-67174 (1992) describes a technique which generates a full-color image using a compact fixing unit and with superior quality by reducing a rotation speed of an intermediate image transfer member to an approximate rotation speed of a fixing unit after a full-color and full-one-page image has been completely transferred onto the intermediate image transfer member.

For another example, Japanese Laid-Open Patent Publication No. JPAP06-11977 (1994) describes a technique which relates to process line speeds of the image forming and image transfer operations.

However, none of these techniques comprehensively addresses the problems of image resolution and fixing efficiency, and none necessarily improves the print efficiency in an appropriate manner in accordance with various factors required for performing the image forming operation.

In addition, it is known that when the process line speed with respect to the photoconductive drum and the development mechanisms is changed, development agents on a development sleeve in contact with the photoconductive drum cause an abnormal print on the background of a recording sheet.

An image forming apparatus using an electrophotographic method has also been popularly used, in which an image forming is achieved by a sequential operation including an image exposure on a photoconductor with a laser beam, an image development with toner, and so forth. In such an image forming apparatus, a recording density of image has been desired to be increased. One method is a reduction of a rotation speed, or a process line speed, of the photoconductor, which method however adversely affects operation time. Accordingly, it would be useful if the user can select a process line speed out of a plurality of prestored process line speeds in accordance with a type of job that the user conducts, such as a speed-prioritized job or a quality-prioritized job, for example.

For example, Japanese Laid-Open Patent Publication No. JPAP07-13406 describes a technique which allows the image forming operations at different process line speeds with a measure for avoiding the variations of voltage on the surface of the photoconductor by controlling a grid voltage.

However, controlling the grid voltage is not sufficient to control the stability of the voltage on the surface of the photoconductor which determines the recording density of image, since the voltage on the surface of the photoconductor is determined by amounts of charge supplied by a charging member and light exposure supplied by an optical writing system. That is, when the process line speed is changed, a current value affecting a unit area of the surface of the photoconductor will be varied. Also, a charge level at an image developing position by an image development member will be varied during a time period that the photoconductor rotates so that a position of the surface thereof moves from the charge position to the image development position or that the photoconductor rotates so that a position of the surface thereof moves from the exposure position to the image development position.

As a typical result of the above-described phenomena with respect to the insufficient control of the voltage on the surface of the photoconductor, an image is reproduced on a recording sheet in an inferior condition, having abnormal features such as dirty black stripes and the like.

Therefore, it is understood that there is no image forming apparatus available which is capable of performing an image forming operation in a plurality of different process line speed modes of a photoconductor while avoiding a reproduction of image in an inferior condition.

SUMMARY OF THE INVENTION

Accordingly, an object of a first aspect of the present invention is to provide a novel image forming device which can properly perform a shading correction while avoiding an abnormal effect on an image output quality caused by dust.

To achieve the above-mentioned and other objects, an image forming apparatus according to the first aspect of the invention includes an image forming apparatus, comprising an image carrying member which can carry on a surface thereof an image formed by exposing said surface to a scanning laser beam in accordance with an image forming process; an intermediate image transfer member positioned to receive said image from said image carrying member, and transfer said image onto a recording sheet in accordance with an image transfer process; a memory which stores a plurality of values of selectable process line speeds A, each defining a speed of the image forming process performed on said image carrying member with the scanning laser beam in a sub-scanning direction, and a plurality of values of selectable process line speeds B, each defining a speed of the image transfer process; and a controller connected to control a speed of at least the image carrying member and the intermediate image transfer member such as to make a plurality of combinations of said process line speeds A and B by arbitrarily selecting one of said plurality of values of selectable process line speeds A and one of said plurality of values of selectable process line speeds B and controlling at least the image carrying member and the intermediate image transfer member according to the selected process line speeds.

According to an embodiment of this aspect of the invention, there is further included a plurality of development mechanisms, each of which can contain development agents and which are positioned to develop an image by making the developing agents contact said surface of said image carrying member; and a switch connected to said plurality of development mechanisms such as to switch said plurality of development mechanisms between a first condition in which said development mechanisms cause the development agents to contact said surface of said image carrying member and a second condition in which said development mechanisms cause the development agents to come out of contact with said surface of said image carrying member. The controller is constructed to control said switch to switch each of said plurality of development mechanisms into said second condition when the process line speeds A and B are changing.

According to another feature of the image forming apparatus according to the first aspect of the invention, it may instead comprise image carrying means for carrying on a surface thereof an image formed by exposing said surface to a scanning laser beam in accordance with an image forming process; intermediate image transfer means for receiving the image from said image carrying member, and for transferring the image onto a recording sheet in accordance with an image transfer process; memory means for storing a plurality of values of selectable process line speeds A, each defining a speed of the image forming process performed on said image carrying member with the scanning laser beam in a sub-scanning direction, and a plurality of values of selectable process line speeds B, each defining a speed of the image transfer process; and control means for controlling a speed of at least the image carrying means and the intermediate image transfer means such as to make a plurality of combinations of said process line speeds A and B by arbitrarily selecting one of said plurality of values of selectable process line speeds A and one of said plurality of values of selectable process line speeds B and for controlling at least the image carrying means and the intermediate image transfer means according to the selected process line speeds.

In this case, a plurality of development means are provided for developing an image by making developing agents contact said surface of said image carrying means; and means are provided for switching said plurality of development means between a first condition in which said development means cause the development agents to contact said surface of said image carrying means and a second condition in which said development means cause the development agents to come out of contact with said surface of said image carrying means. In this case, the control means comprises means for switching each of said plurality of development means into said second condition when the process line speeds A and B are changing.

According to yet another feature of the image forming apparatus according to the first aspect of the invention, it may instead comprise an image forming process comprising the steps of forming an image on a surface of an image carrying member by exposing said surface to a scanning laser beam; transferring the image onto an intermediate image transfer member; transferring the image onto a recording sheet; selecting a combination of process line speeds A and B by arbitrarily selecting one of the plurality of values of selectable process line speeds A and one of said plurality of values of selectable process line speeds B, wherein the selectable process line speeds A each define a speed of the forming step in a sub-scanning direction, and the selectable process line speeds B each define a speed of the image transfer steps; and; and controlling at least the image carrying member and the intermediate image transfer member according to the selected process line speeds.

In this case, a plurality of development mechanisms, each of which can contain development agents, are positioned to develop an image by making the developing agents contact said surface of said image carrying member; and when the process line speeds A and B are changing, a plurality of development mechanisms containing development agents are switched between a first condition in which said development mechanisms cause the development agents to contact said surface of said image carrying member and a second condition in which said development mechanisms cause the development agents to come out of contact with said surface of said image carrying member.

According to any of the above features of the first aspect of the invention, the plurality of combinations includes either a combination in which said process line speed A is greater than said process line speed B or a combination in which said process line speed A is smaller than said process line speed B.

An object according to a second aspect of the present invention is to provide a novel image forming apparatus which is capable of performing an image forming operation in a plurality of different process line speed modes of a photoconductor while avoiding a reproduction of image in an inferior condition.

To achieve these and other objects, a novel image forming apparatus according to a feature of the second aspect of the invention includes an image forming apparatus, comprising a photoconductor member which may be driven in a plurality of process line speeds; a voltage sensor positioned to detect a voltage on a surface of said photoconductor member; a toner deposition sensor positioned to detect an amount of toner deposited on said surface of said photoconductor member; a charging member positioned to provides a charge onto said surface of said photoconductor member; a grid adjusting member which controls a grid voltage of said charging member; a laser exposure unit which generates a laser beam modulated in accordance with an image signal and which is positioned to expose said surface of said photoconductor member to said laser beam; an exposure adjusting member which adjusts an amount of a laser beam exposure from said laser exposure unit; a development gamma detecting member which detects a development gamma line by performing a sequential operation including the steps of forming an electrostatic latent image including a plurality of patterns on said surface of said photoconductor member; reading the voltages of said plurality of patterns with said voltage sensor; developing said electrostatic latent image with toner; reading the amount of toner deposited on said plurality of patterns with said toner deposition sensor; and performing a predetermined operation to obtain said development gamma line; a reference table which includes information to determine appropriate values of a voltage level on said surface of said photoconductor member, a development bias, and an after-exposure voltage on said surface of said photoconductor member, in accordance with said development gamma line obtained with said development gamma detecting member; and a controller which detects the voltage on said surface of said photoconductor member rotating in each of said process line speeds and determines optimum values of said grid voltage of said charging member and said amount of said laser beam exposure from said laser exposure unit to obtain the respective required voltage level used by said grid adjusting member, and said after-exposure voltage used by said exposure adjusting member, on the basis of said detected voltage and with reference to said information included in said reference table.

An input member may be provided to allow an arbitrary value to be input into said reference table.

A novel image forming apparatus according to a further feature of the second aspect of the invention includes a photoconductor which may be driven in a plurality of process line speeds; voltage sensing means for detecting a voltage on a surface of said photoconductor member; toner deposition sensor means for detecting an amount of toner deposited on said surface of said photoconductor member; charging means for providing a charge onto said surface of said photoconductor member; a grid adjusting means for controlling a grid voltage of said charging means; laser exposure means for generating a laser beam modulated in accordance with an image signal and for exposing said surface of said photoconductor member to said laser beam; exposure adjusting means for adjusting an amount of a laser beam exposure from said laser exposure means; development gamma detecting means for detecting a development gamma line by performing a sequential operation including the steps of forming an electrostatic latent image including a plurality of patterns on said surface of said photoconductor member; reading the voltages of said plurality of patterns with said voltage sensing means; developing said electrostatic latent image with toner; reading the amount of toner deposited on said plurality of patterns with said toner deposition sensor means; and performing a predetermined operation to obtain said development gamma line; reference means for determining appropriate values of a voltage level on said surface of said photoconductor member, a development bias and an after-exposure voltage on said surface of said photoconductor member, in accordance with said development gamma line obtained with said development gamma detecting means; and controller means for detecting the voltage on said surface of said photoconductor member rotating in each of said process line speeds and for determining optimum values of said grid voltage of said charging means and said amount of said laser beam exposure from said laser exposure means to obtain the respective required voltage level used by said grid adjusting means, and said after-exposure voltage used by said exposure adjusting means, on the basis of said detected voltage and with reference to said information included in said reference means.

A novel image forming process according to yet a further feature of the second aspect of the invention is performed by an image forming apparatus comprising a photoconductor member which may be driven in a plurality of process line speeds; a voltage sensor positioned to detect a voltage on a surface of said photoconductor member; a toner deposition sensor positioned to detect an amount of toner deposited on said surface of said photoconductor member; a charging member positioned to provides a charge onto said surface of said photoconductor member; a grid adjusting member which controls a grid voltage of said charging member; a laser exposure unit which generates a laser beam modulated in accordance with an image signal and which is positioned to expose said surface of said photoconductor member to said laser beam; an exposure adjusting member which adjusts an amount of a laser beam exposure from said laser exposure unit; a development gamma detecting member which detects a development gamma line by performing a sequential operation including the steps of forming an electrostatic latent image including a plurality of patterns on said surface of said photoconductor member; reading the voltages of said plurality of patterns with said voltage sensor; developing said electrostatic latent image with toner; reading the amount of toner deposited on said plurality of patterns with said toner deposition sensor; and performing a predetermined operation to obtain said development gamma line; a reference table which includes information to determine appropriate values of a voltage level on said surface of said photoconductor member, a development bias, and an after-exposure voltage on said surface of said photoconductor member, in accordance with said development gamma line obtained with said development gamma detecting member; and a controller. The process comprises the steps of using said voltage sensor to detect a voltage on a surface of said photoconductor member; using said toner deposition sensor to detect an amount of toner deposited on said surface of said photoconductor member; using said charging member to provide a charge onto said surface of said photoconductor member; using said grid adjusting member to control a grid voltage of said charging member; using said laser exposure unit to generate a laser beam modulated in accordance with an image signal and which is positioned to expose said surface of said photoconductor member to said laser beam; using said exposure adjusting member to adjust an amount of a laser beam exposure from said laser exposure unit; using said development gamma detecting member to detect a development gamma line by performing a sequential operation including the steps of forming an electrostatic latent image including a plurality of patterns on said surface of said photoconductor member; reading the voltages of said plurality of patterns with said voltage sensor; developing said electrostatic latent image with toner; reading the amount of toner deposited on said plurality of patterns with said toner deposition sensor; and performing a predetermined operation to obtain said development gamma line; and using the controller to detect the voltage on said surface of said photoconductor member rotating in each of said process line speeds and to determine optimum values of said grid voltage of said charging member and said amount of said laser beam exposure from said laser exposure unit to obtain the respective required voltage level used by said grid adjusting member, and said after-exposure voltage used by said exposure adjusting member, on the basis of said detected voltage and with reference to said information included in said reference table.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein:

FIG. 10 is an exemplary information table which contains information of desired development potentials with associated voltages in the copying apparatus of FIG. 7.

DESCRIPTION OF THE PREFERRED EMBODIMENTS

Figure 1:
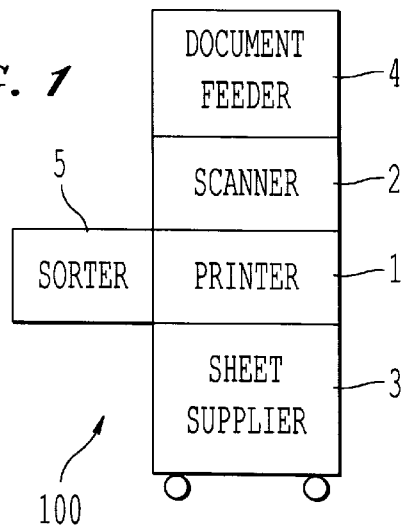
FIG. 1 is an illustration for explaining an exemplary structure of a color copying machine according to an embodiment of the first aspect of the present invention.

In describing preferred embodiments of the present invention illustrated in the drawings, specific terminology is employed for the sake of clarity. However, the present invention is not intended to be limited to the specific terminology so selected and it is to be understood that each specific element includes all technical equivalents which operate in a similar manner.

Referring now to the drawings, wherein like reference numerals designate identical or corresponding parts throughout the several views, and more particularly to FIG. 1 thereof, there is illustrated a full-color copying apparatus 100 according to an embodiment of the present invention. The full-color copying apparatus 100 of FIG. 1 uses black (B), cyan (C), magenta (M), and yellow (Y) toner to produce a full-color image. As illustrated in FIG. 1, the copying apparatus 100 includes a printer 1, a scanner 2, a paper supplier 3, a document feeder 4, and a sorter 5.

Figure 2:
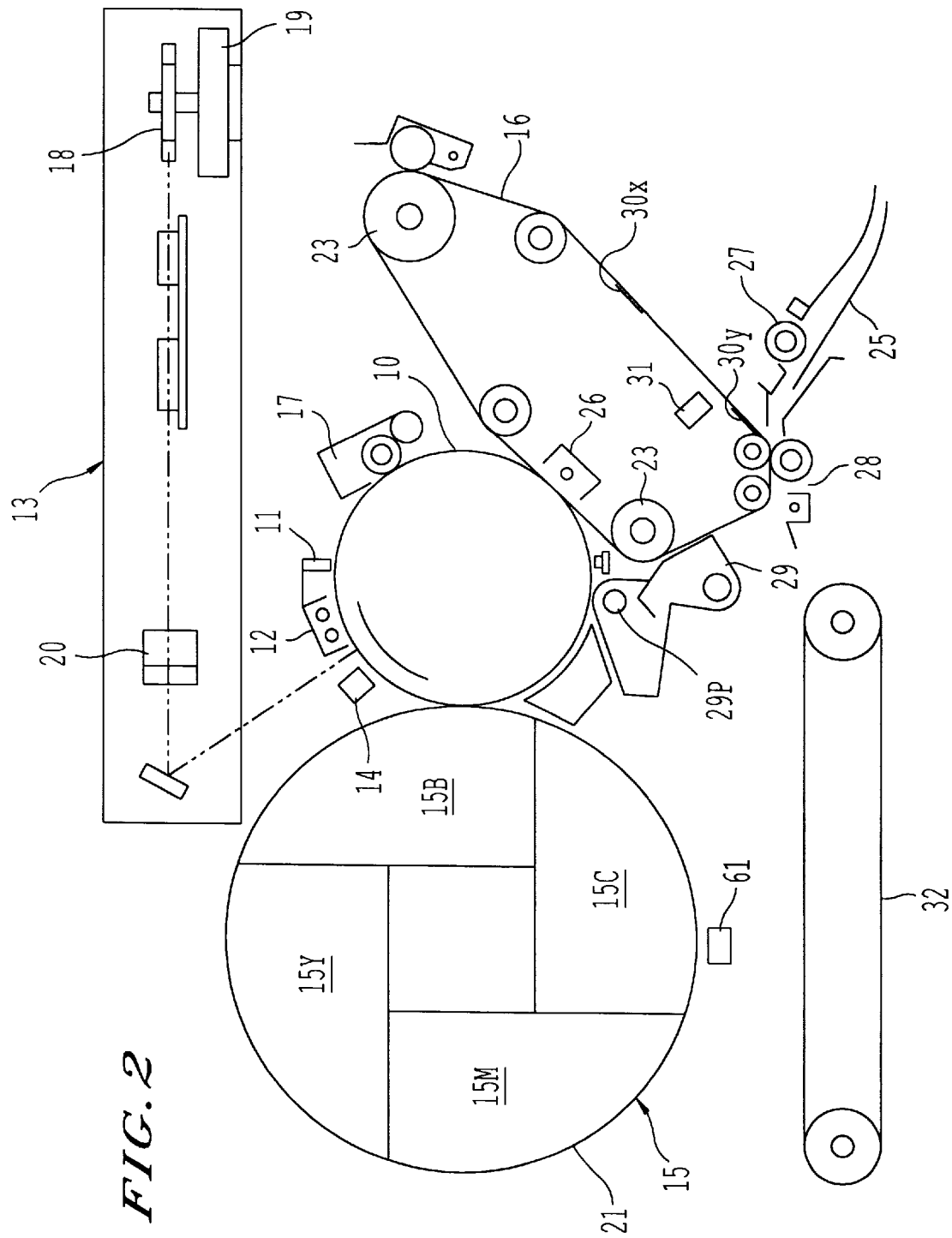
FIG. 2 is an illustration for explaining an exemplary configuration of an image forming mechanism of the color copying machine of FIG. 1.

The printer 1 of the copying apparatus 100 includes an image forming mechanism which has an exemplary structure as illustrated in FIG. 2. The image forming mechanism of the printer 1 includes, at a center thereof a drum-shaped photoconductor 10 as an image carrying member which is driven to rotate counterclockwise in the drawing. The image forming mechanism further includes, around the photoconductor 10 according to an electrophotographic method, a quenching lamp 11, a scorotron-type drum charger 12, an optical writing system 13, an eraser 14, a full-color image development mechanism 15, an intermediate image transfer belt 16, and a photoconductor cleaning unit 17.

In an image forming process, a laser diode (not shown) is driven so as to generate a modulated laser beam in accordance with an image data stream. The optical writing system 13 includes a polygon mirror 18, a polygon motor 19, an fθ (ef theta) lens 20, and so forth. The polygon mirror 18 is driven by the polygon mirror 19 to rotate in a relatively high speed so that the modulated laser beam impinging on the polygon mirror 18 is reflected to the photoconductor 10 through the fθ lens 20 to scan the surface thereof.

The full-color image development mechanism 15 includes black toner development unit 15B, cyan toner development unit 15C, magenta toner development unit 15M, and yellow toner development unit 15Y. The full-color image development unit 15 further includes a cylinder-shaped revolver unit 21. The interior of the revolver unit 21 is quartered in which the development units 15B, 15C, 15M and 15Y are disposed in a equal manner. An exemplary mechanism similar to such revolver unit 21 is described, for example, in U.S. Pat. No. 5,724,634 issued Mar. 3, 1998 to Maruta, the teachings of which are hereby incorporated by reference. The revolver unit 21 is driven by a revolver motor 22 (FIG. 4) to rotate clockwise in the drawing so as to move a development unit in a position to face the photoconductor 10. In this way, one of the development units 15B, 15C, 15M and 15Y can be selected to use one of the black, cyan, magenta, and yellow colors.

In addition, each development unit has a mechanism for selectively changing (rotating) the position of a development sleeve of each development unit between operative and inoperative positions so as not to have the developer on the development sleeve contact the photoconductor 10 in a rotation mode. Similar examples of such mechanism are described, for example, in U.S. Pat. No. 5,270,783 issued Dec. 14, 1993 to Bisaiji, et al., the teachings of which are hereby incorporated by reference.

The intermediate image transfer belt 16 has an image transfer surface longer than the image carrying surface of the photoconductor 10 and on which at least two A4-sized-page images can be formed. As illustrated in FIG. 2, the intermediate image transfer belt 16 is rotatably held by a plurality of rollers 23 and other rollers, and is driven by a drum motor 24 (FIG. 4) which also drives the photoconductor 10.

In a full-color copying mode, for example, a toner image of each color is transferred four times, one after another, from the photoconductor 10 to the intermediate image transfer belt 16. Each image transfer from the photoconductor 10 to the intermediate image transfer belt 16 is referred to as a belt transfer operation. For this belt transfer operation, a belt transfer charger 26 is disposed at a position opposite to the photoconductor 10 inside the intermediate image transfer belt 16. The full-color toner image transferred on the intermediate image transfer belt 16 is further transferred by a sheet transfer charger 28 onto a recording sheet 25 which is advanced by a registration roller 27. This further transfer is referred to as a sheet transfer operation. The intermediate image transfer belt 16 is cleaned by a belt cleaning unit 29 at a position after the sheet transfer operation and before the belt transfer operation. In order to perform a cleaning operation, the belt cleaning unit 29 moves around a pivot 29P to a position where the belt cleaning unit 29 contacts the intermediate image transfer belt 16. Upon completing the cleaning operation, the belt cleaning unit 29 moves around the pivot 29P to another position where the belt cleaning unit 29 comes out of contact with the intermediate image transfer belt 16.

Further, the intermediate image transfer belt 16 has register marks 30x and 30y at predetermined interior positions thereof. The register mark 30x is used for a determination of a timing for transferring each color toner image from the photoconductor 10 onto the intermediate image transfer belt 16. The register mark 30y is used for a determination of a timing for transferring the full-color image from the intermediate image transfer belt 16 onto the recording sheet 25 sent by the registration roller 27. These register marks 30x and 30y are detected by a mark sensor 31 which is disposed at a predetermined position inside the intermediate image transfer belt 16. After the sheet transfer operation is completed, the recording sheet 25 is further advanced to a fixing unit 33 (FIG. 4) by a sheet transfer belt 32.

In addition, a reference numeral 61 of FIG. 2 denotes a revolver home position sensor for detecting that the full-color image development mechanism 15 has returned to its home position.

In this way, the image forming mechanism of the printer 1 is structured.

Figure 3:
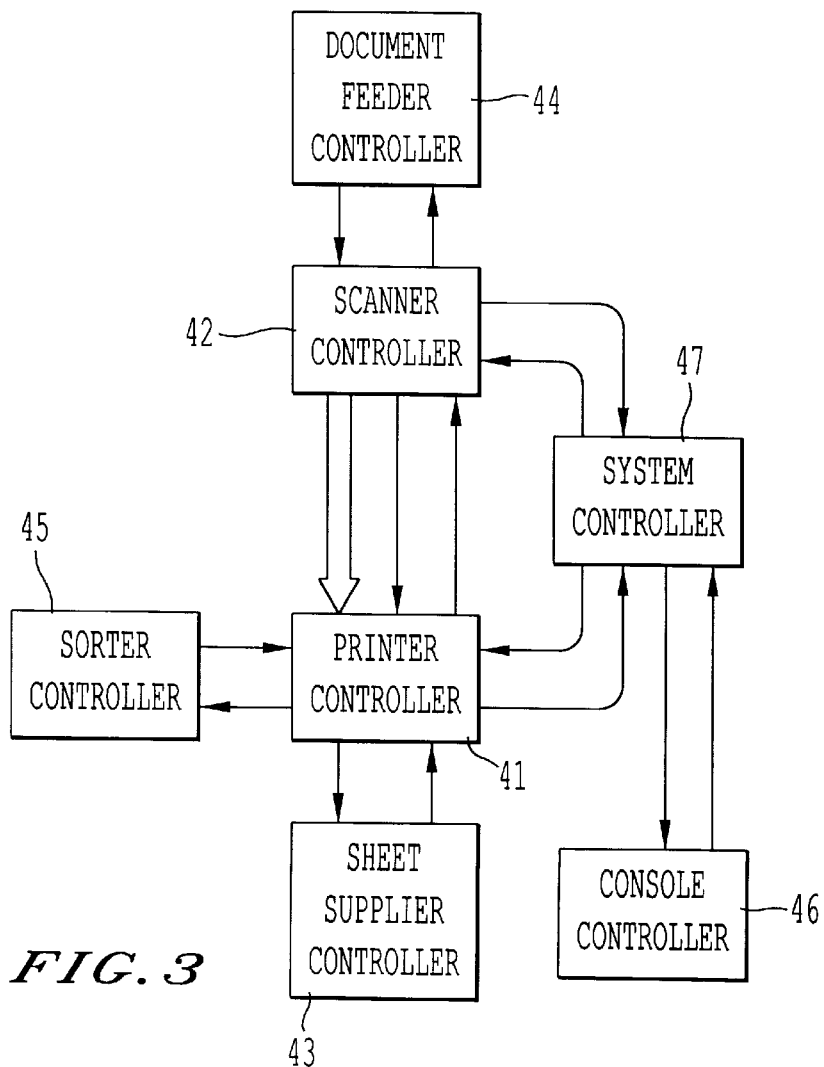
FIG. 3 is an illustration for explaining an exemplary control system which controls each mechanism of the color copying machine of FIG. 1.

The thus-structured image forming mechanism is controlled by a printer controller 41. As illustrated in FIG. 3, the printer controller 41 is one of the controllers which are included in the full-color copying apparatus 100. As illustrated in FIG. 3, the full-color copying apparatus 100 includes a plurality of controllers to control the respective mechanisms thereof shown in FIG. 1. These controllers are a printer controller 41, a scanner controller 42, a paper supplier controller 43, a document feeder controller 44, a sorter controller 45, a console panel controller 46, and a system controller 47. The printer controller 41 controls the above-described operations of the printer 1, and the system controller 47 controls, in particular, a print process, an image writing process, a recording sheet supply process, a document transfer process, and a sort process.

Figure 4:
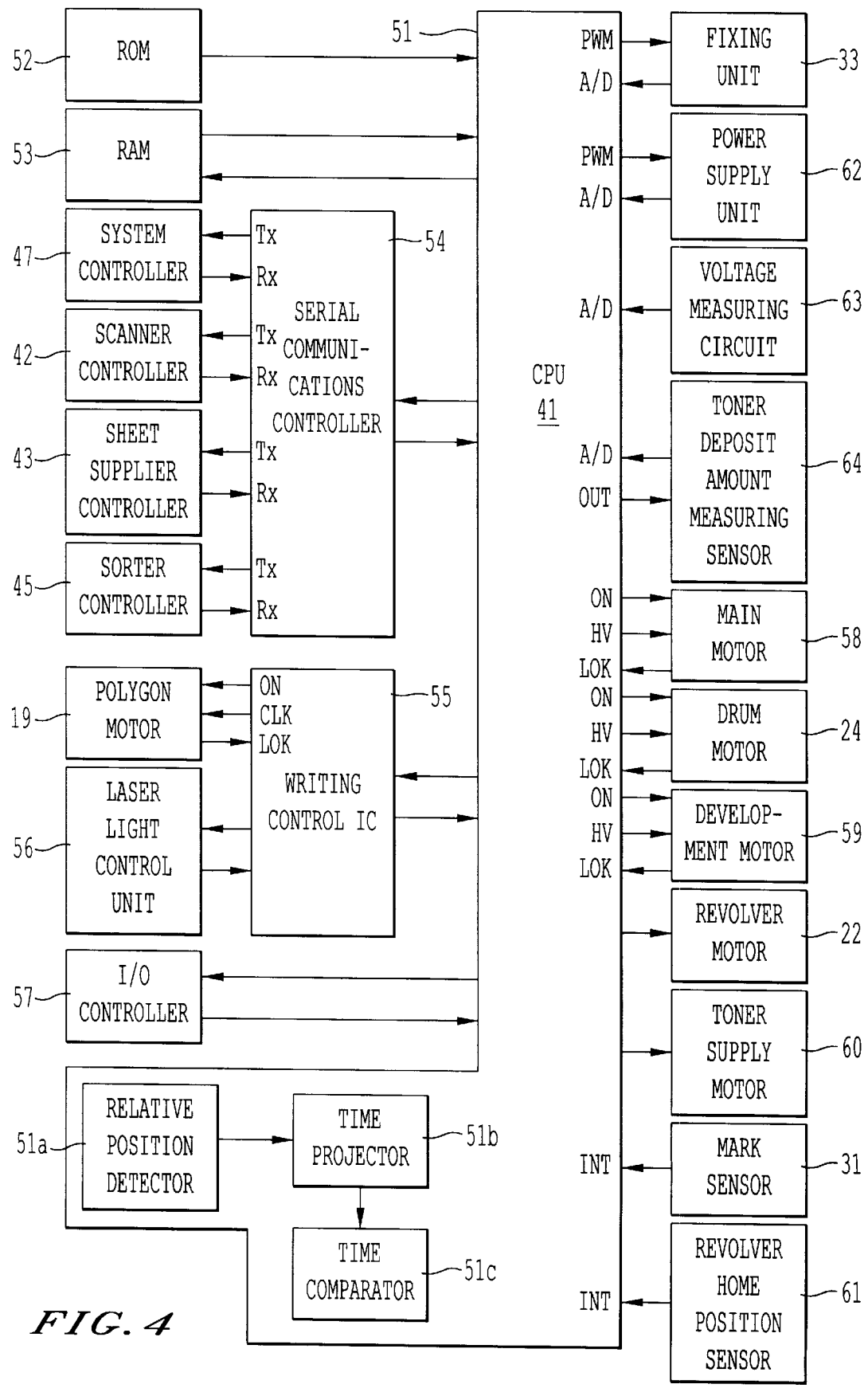
FIG. 4 is a block diagram of a printer controller and associated circuits and mechanisms of the color copying machine of FIG. 1.

Next, an exemplary configuration of the printer controller 41 is explained with reference to FIG. 4. The printer controller 41 is a microcomputer-based controller that includes a CPU (Central Processing Unit) 51, a ROM (Read Only Memory) 52, and a RAM (Random Access Memory) 53, as shown in FIG. 4. In accordance with control programs which are previously stored in the ROM 52, the CPU 51 controls various components shown in FIG. 4, including a serial communications controller 54, a writing control IC (Integrated Circuit) 55, a laser light source unit 56, and an IO (Input and Output) controller 57. The CPU 51 further controls a main motor 58, the aforementioned drum motor 24, a development motor 59, the aforementioned revolver motor 22, a toner supply motor 60, and the aforementioned polygon motor 19. The CPU 51 further controls the aforementioned mark sensor 31, the aforementioned revolver home position sensor 61, and the aforementioned fixing unit 33. The CPU 51 further controls a power supply unit 62, a voltage measuring circuit 63, and a toner deposit amount measuring sensor 64.

The CPU 51 includes a relative position detector 51a, a time projector 51b, and a time comparator 51c. The relative position detector 51a detects relative positions of the mark sensor 31 and the register marks 30x and 30y of the intermediate image transfer belt 16. The time projector 51b projects, at an image forming start time, a time needed for the mark sensor 31 to detect the register marks 30x and 30y on the basis of the relative positions detected by the relative position detector 51a. The time comparator 51c calculates a time difference between the time projected by the time projector 51b and a time needed for the intermediate image transfer belt 16 to rotate at a stable speed when the rotation speed thereof is reduced by half.

The writing control IC 55 controls an image data writing with the laser beam through the laser light source control unit 56 and the polygon motor 19.

Now, a moving speed of the laser beam relative to the photoconductor 10 in the sub-scanning direction is referred to as a process line speed A. This process line speed A determines an image writing density with the laser beam relative to the photoconductor 10 in the sub-scanning direction. In order to be able to form an image with different resolutions, the embodiment of the present invention has exemplary three different process line speeds, as shown in the following Table 1, in the ROM 52 or the RAM 53.

TABLE 1

| Scanning Resolution | Polygon Rotation | Process Line Speed A |
|---|---|---|
| 400 dpi | 24,566.9 rpm | 156 mm/s |
| 600 dpi | 24,556.9 rpm | 104 mm/s |
| 800 dpi | 24,566.9 rpm | 78 mm/s |

Also, a speed of an image transfer from the intermediate image transfer belt 16 to the recording sheet 25 is referred to as a process line speed B. This process line speed B determines an image transfer resolution relative to the surface of the recording sheet 25. In order to be able to form an image with different resolutions by the types of the recording sheets used, the printer controller 41 has exemplary two process line speeds B, as shown in the following Table 2, in the ROM 52 or the RAM 53.

TABLE 2

| Type of Sheet | Process Line Speed B |
|---|---|
| Type 1 (Ordinary Copy Sheet) | 156 mm/s |
| Type 2 (Thick Sheet and OHP Sheet) | 78 mm/s |

The printer controller 41 is allowed to use any one of the above-mentioned three process line speeds A in combination with any one of the above-mentioned two process line speeds B. Accordingly, one of the following six combinations shown in Table 3 can be selected.

TABLE 3

| Selectable Mode | Process Line Speeds A and B |
|---|---|
| 400 dpi with type 1 sheet | A = B = 156 mm/s |
| 400 dpi with type 2 sheet | A = 156 mm/s, B = 78 mm/s |

TABLE 3-continued

| Selectable Mode | Process Line Speeds A and B |
| --- | --- |
| 600 dpi with type 1 sheet | A = 104 mm/s, B = 156 mm/s |
| 600 dpi with type 2 sheet | A = 104 mm/s, B = 78 mm/s |
| 800 dpi with type 1 sheet | A = 78 mm/s, B = 156 mm/s |
| 800 dpi with type 2 sheet | A = B = 78 mm/s |

Figure 5:
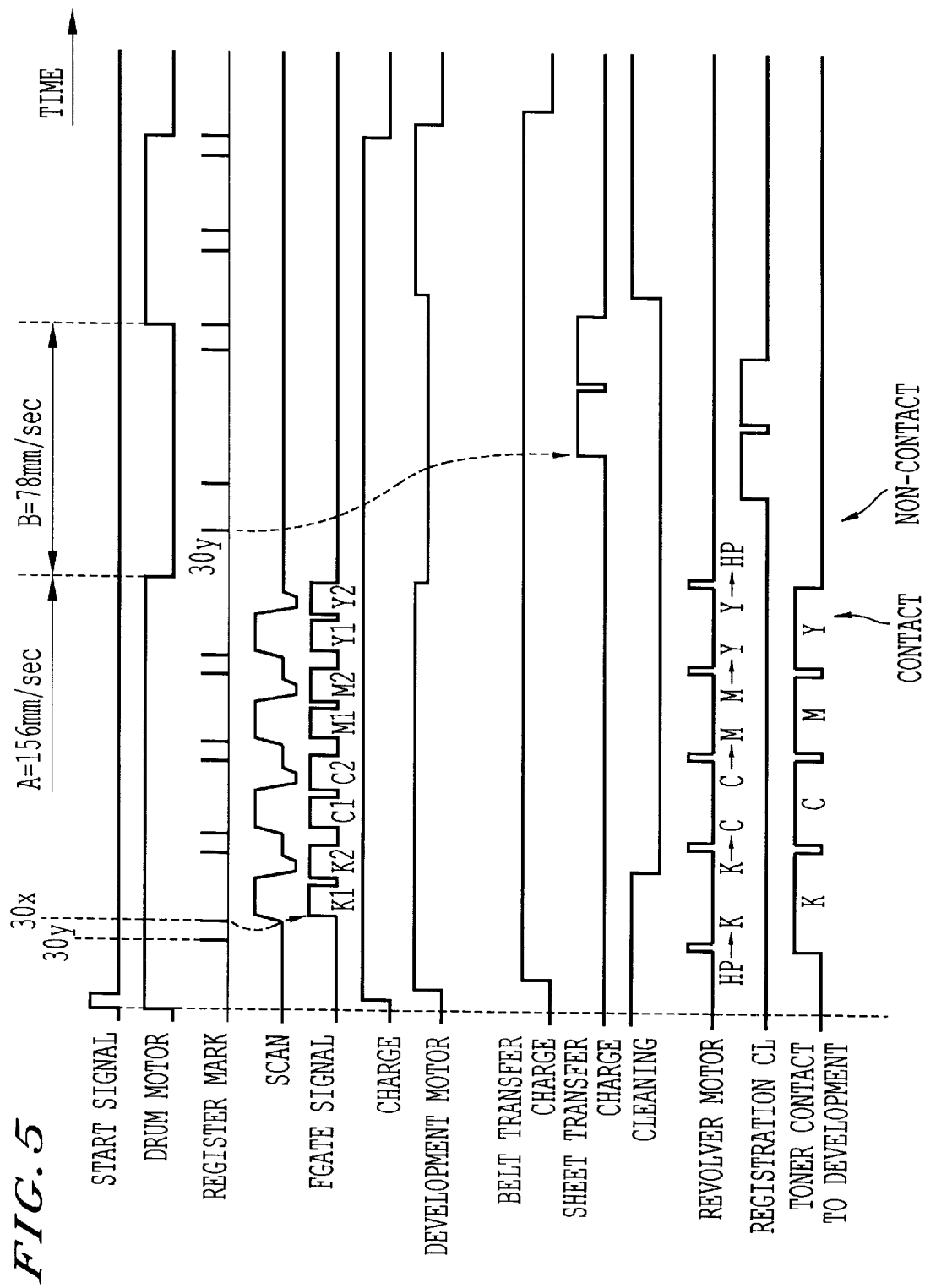
FIG. 5 is a timechart for explaining an image forming operation in an image forming mode of 400 dpi with a type-2 sheet.

Next, an exemplary sequence control of the printer controller 41 to form a full-color image in an image forming mode of 400 dpi with a type-2 sheet is explained with reference to FIG. 5. In the image forming mode of 400 dpi with the type-2 sheet, the process line speed A is set to a value of 156 mm/s, and the process line speed B to a value of 78 mm/s. In this case, two consecutive A4-sized-page images will be formed in an image forming mode of 400 dpi with a type-2 sheet on the intermediate image transfer belt 16.

Upon receiving an image forming start signal (command), the CPU 51 turns on the quenching lamp 11 and the drum motor 24 to start an image forming cycle. By the activated drum motor 24, the photoconductor 10 rotates counterclockwise and the intermediate image transfer belt 16 clockwise, both at a process line speed A of 156 mm/s.

When the photoconductor 10 rotates such that a surface thereof which is first exposed to the activated quenching lamp 11 reaches a charging position, the printer controller 41 turns on the drum charger 12. Then, when the photoconductor 10 further rotates such that a surface thereof which is first charged by the activated drum charger 12 reaches an image development position, the printer controller 41 turns on development DC (Direct Current) and AC (Alternate Current) biases and the development motor 59. When the photoconductor 10 further rotates such that a surface thereof which has first received an image development operation of the development units 15B, 15C, 15M, and 15Y with the activated development DC and AC biases, reaches an intermediate image transfer position, the printer controller 41 turns on the belt transfer charger 26. In the above operation, if the development unit located in the image development position is not the one having a color selected (e.g., the black color), the printer controller 41 rotates the revolver unit 21 so that a development unit having a correct color moves to the image development position, after turning on the development DC and AC biases.

When the mark sensor 31 detects the register mark 30x in a rotation of the intermediate image transfer belt 16, the printer controller 41 generates a scanning start signal (command) for a first color (e.g., the black color). Then, the electrostatic latent image of consecutive two pages on the photoconductor 10 is developed with the first color (e.g., the black color) and transferred onto the intermediate image transfer belt 16. After a completion of the intermediate image transfer operation, the printer controller 41 rotates the revolver unit 21 to develop the image with a second color (e.g., the cyan color), so that the development unit 15c is carried to the development position. Also, upon a completion of the intermediate image transfer operation, the belt cleaning unit 29 moves around the pivot 29P so as to be released from contact with the intermediate image transfer belt 16, thereby avoiding an erasure of the image formed on the intermediate image transfer belt 16.

After that, when the mark sensor 31 detects the register mark 30x for a second time, the printer controller 41 again generates a scanning start signal (command) for a second color (e.g., the cyan color). As is performed for the first color, the cyan color image is transferred onto the intermediate image transfer belt 16 so as to be overlaid on the first color image. Then, the revolver unit 21 is controlled to rotate so that the development unit 15M, for example, is located in the development position to develop the image with a third color (the magenta color). The images with the third and fourth colors are in turn developed in a similar manner and sequentially overlaid on the image with the first and second colors.

On the other hand, the paper supplier 3 feeds a recording sheet 25 (a thick sheet) at the commencement of the image forming operation. Registration of the recording sheet 25 is conducted so that, when the upstream edge of the toner image on the intermediate image transfer belt 16 comes close to the sheet transfer charger 28, the upstream edge of the toner image aligns with the upstream edge of the recording sheet 25. This registration is performed on the basis of the detection of the register mark 30y by the mark sensor 31, where the photoconductor 10 and the intermediate image transfer belt 16 rotate at a process line speed B of 78 mm/s, which has been changed from 156 mm/s when the transfer of the toner image to the intermediate image transfer belt 16 had been completed. At such a change of process line speed B, each of the development units 15bB, 15C, 16M, and 15Y is located at a position so as not to contact the photoconductor 10.

The recording sheet 25 is fed to a position of sheet transfer operation by the sheet transfer charger 28 which is connected to a positive voltage power supply unit, with the thus synchronized toner image on the intermediate image transfer belt 16. At the position of the sheet transfer operation, the recording sheet 25 is charged with a positive voltage by a corona discharge current of the sheet transfer charger 28 and the toner image on the intermediate image transfer belt 16 is attracted by the charge on the recording sheet 25. Thereby, the toner image is transferred onto the recording sheet 25. The charge of the recording sheet 25 is discharged by a discharge mechanism (not shown) disposed immediately after the sheet transfer charger 28. The recording sheet 25 having the toner image is further forwarded to the fixing unit 33 by the sheet transfer belt 32. In the fixing unit 33, the toner image is fixed on the recording sheet 25 by heat and pressure. After the fixing unit 33, the recording sheet 25 is ejected to a predetermined location of the copying apparatus 100.

In this way, in the image forming mode of 400 dpi with a type-2 sheet, the process line speed B is set at 78 mm/s which is relatively slow so as to sufficiently fix an image even on the thick recording sheet 25, while the process line speed A is set at 156 mm/s which is a standard speed so as to be able to conduct an image forming operation at a resolution of 400 dpi. Thereby, a color toner image can be formed on the thick recording sheet 25 in a superior manner.

In addition, an embodiment according to the present invention can avoid generation of an inferior image by deposition of toner or toner carrier on a dirty background, since the development units 15B, 15C, 15M, and 15Y are moved to positions not in contact with the photoconductor 10 during the change of the process line speed B.

Upon completing the transfer of the toner image onto the recording sheet 25, the photoconductor 10 and the intermediate image transfer belt 16 proceed to an ending sequence. That is, in the ending sequence, the belt transfer charger 26 is turned off. Then, a portion of the photoconductor 10, which is exposed to the belt transfer charger 26 when the belt transfer charger 26 is turned off passes the position at which the portion is exposed to the drum charger 12. At this time, the drum charger 12 is turned off. Further, a portion of the photoconductor 10, which is exposed to the drum charger 12 when the drum charger 12 is turned off, passes the position at which the image development operation is conducted. At this time, the development AC and DC biases and the development motor 15 are turned off. From this time period, the mark sensor 31 is in an operative mode for detecting the register marks 30x and 30y of the intermediate image transfer belt 16. Then, the intermediate image transfer belt 16 is further rotated so that the register mark 30x proceeds to a predetermined position after being detected by the mark sensor 31. At this time, the drum motor 24 and the quenching lamp are turned off. The ending sequence is conducted in this way.

Figure 6:
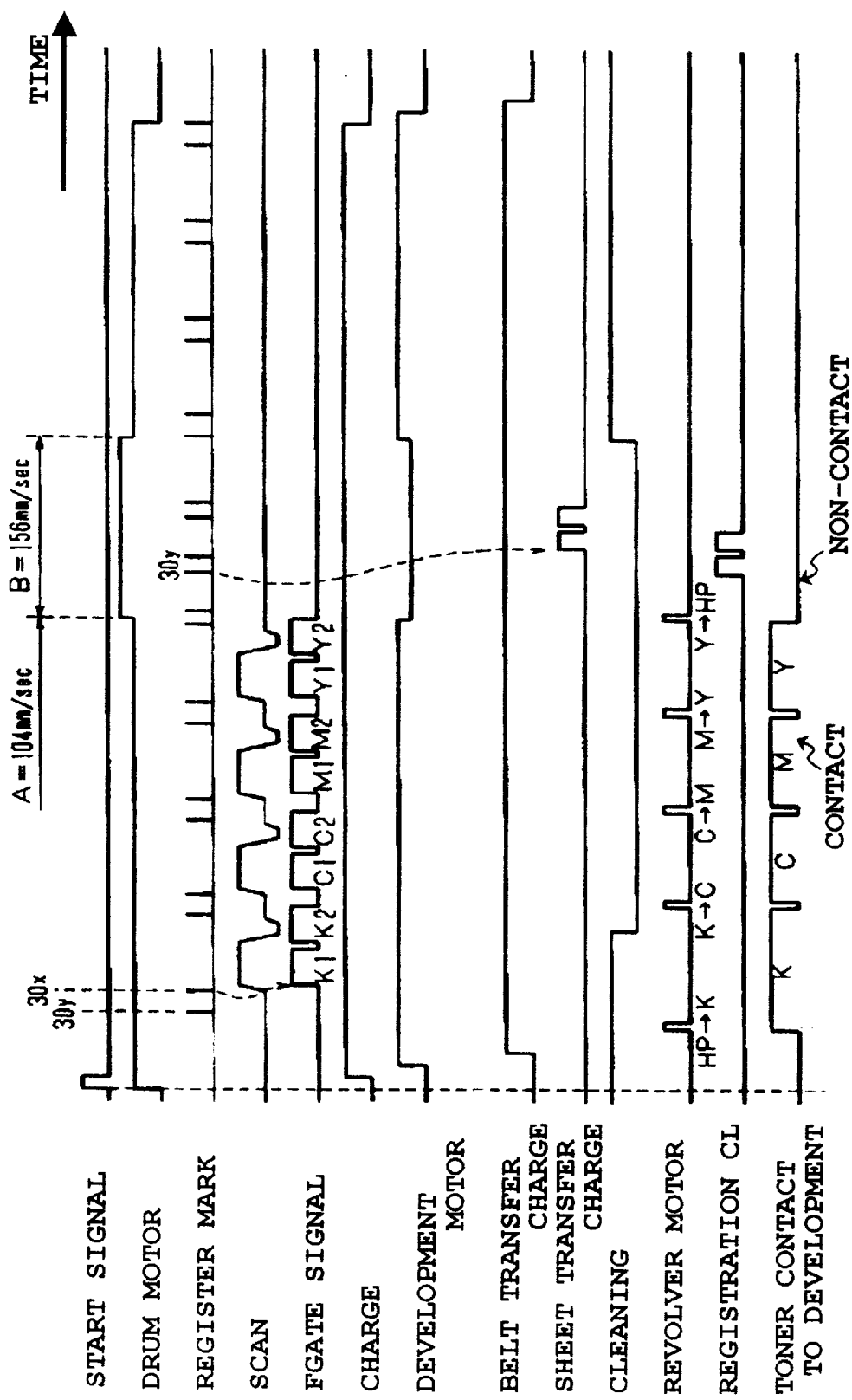
FIG. 6 is a timechart for explaining an image forming operation in an image forming mode of 600 dpi with a type-1 sheet by the color copying machine of FIG. 1.

Next, an exemplary sequence control of the printer controller 41 to form a full-color image in an image forming mode of 600 dpi with a type-1 sheet is explained with reference to FIG. 6. In the image forming mode of 600 dpi with the type-1 sheet, the process line speed A is set to 104 mm/s, and the process line speed B to 156 mm/s. In this case, consecutive two A4-sized-page images will be formed in an image forming mode of 600 dpi with a type-1 sheet on the intermediate image transfer belt 16.

Upon receiving an image forming start signal (command), the CPU 51 turns on the quenching lamp 11 and the drum motor 24 to start an image forming cycle. By the activated drum motor 24, the photoconductor 10 rotates counterclockwise and the intermediate image transfer belt 16 clockwise, both at a process line speed A of 104 mm/s.

When the photoconductor 10 rotates such that a surface thereof which is first exposed to the activated quenching lamp 11 reaches a charging position, the printer controller 41 turns on the drum charger 12. Then, when the photoconductor 10 further rotates such that a surface thereof which is first charged by the activated drum charger 12 reaches an image development position, the printer controller 41 turns on development DC (Direct Current) and AC (Alternate Current) biases and the development motor 59. When the photoconductor 10 further rotates such that a surface thereof, which has first received an image development operation of the development units 15B, 15C, 15M, or 15Y with the activated development DC and AC biases, reaches an intermediate image transfer position, the printer controller 41 turns on the belt transfer charger 26. In the above operation, if the development unit located in the image development position is not the one having a color selected (e.g., the black color), the printer controller 41 rotates the revolver unit 21 so that a development unit having a correct color moves to the image development position, after turning on the development DC and AC biases.

When the mark sensor 31 detects the register mark 30x during rotation of the intermediate image transfer belt 16, the printer controller 41 generates a scanning start signal (command) for a first color (e.g., the black color). Then, the electrostatic latent image of consecutive two pages on the photoconductor 10 is developed with the first color (e.g., the black color) and transferred onto the intermediate image transfer belt 16. After completion of the intermediate image transfer operation, the printer controller 41 rotates the revolver unit 21 to develop the image with a second color (e.g., the cyan color), so that the development unit 15C is carried to the development position. Also, upon completion of the intermediate image transfer operation, the belt cleaning unit 29 is released from contact with the intermediate image transfer belt 16 so as not to erase the image thereon.

After that, when the mark sensor 31 detects the register mark 30x for a second time, the printer controller 41 again generates a scanning start signal (command) for a second color (e.g., the cyan color). As is performed for the first color, the cyan color image is transferred onto the intermediate image transfer belt 16 so as to be overlaid on the first color image. Then, the revolver unit 21 is controlled to rotate so that the development unit 15M, for example, is located in the development position to develop the image with a third color (the magenta color). The images with the third and fourth colors are in turn developed in a similar manner and sequentially overlaid on the image with the first and second colors.

On the other hand, the paper supplier 3 feeds a recording sheet 25 (an ordinary sheet) at the commencement of the image forming operation. Registration of the recording sheet 25 is conducted so that, when the upstream edge of the toner image on the intermediate image transfer belt 16 comes close to the sheet transfer charger 28, the upstream edge of the toner image aligns with the upstream edge of the recording sheet 25. This registration is performed on the basis of the detection of the register mark 30y by the mark sensor 31, where the photoconductor 10 and the intermediate image transfer belt 16 rotate at a process line speed B of 156 mm/s, which has been changed from 104 mm/s when the transfer of the toner image to the intermediate image transfer belt 16 had been completed. At such a change of process line speed B, each of the development units 15B, 15C, 16M and 15Y is located at a position so as not to contact with the photoconductor 10.

The recording sheet 25 is fed to a position of sheet transfer operation by the sheet transfer charger 28 which is connected to a positive voltage power supply unit, with the thus synchronized toner image on the intermediate image transfer belt 16. At the position of the sheet transfer operation, the recording sheet 25 is charged with a positive voltage by a corona discharge current of the sheet transfer charger 28 and the toner image on the intermediate image transfer belt 16 is attracted by the charge on the recording sheet 25. Thereby, the toner image is transferred onto the recording sheet 25. The charge of the recording sheet 25 is discharged by a discharge mechanism (not shown) disposed immediately after the sheet transfer charger 28. The recording sheet 25 having the toner image is further forwarded to the fixing unit 33 by the sheet transfer belt 32. In the fixing unit 33, the toner image is fixed on the recording sheet 25 by heat and pressure. After the fixing unit 33, the recording sheet 25 is ejected to a predetermined location of the copying apparatus 100.

In this way, in the image forming mode of 600 dpi with a type-1 sheet, the process line speed B is set at 156 mm/s which is relatively fast so as to increase a total efficiency of printing operation, while the process line speed A is set at 104 mm/s which is relatively slow so as to be able to conduct an image forming operation at a resolution of 600 dpi. Thereby, a high resolution color toner image can be formed at a relatively high print efficiency in a superior manner.

In addition, this embodiment according to the present invention can avoid generation of an inferior image by deposition of toner or toner carrier on a dirty background, since the development units 15B, 15C, 16M and 15Y are moved to positions not in contact with the photoconductor 10 during the change of the process line speed B.

Upon completing the transfer of the toner image onto the recording sheet 25, the photoconductor 10 and the intermediate image transfer belt 16 proceed to an ending sequence.

That is, in the ending sequence, the belt transfer charger 26 is turned off. Then, a portion of the photoconductor 10 which is exposed to the belt transfer charger 26 when the belt transfer charger 26 is turned off, passes the position at which the portion is exposed to the drum charger 12. At this time, the drum charger 12 is turned off. Further, a portion of the photoconductor 10, which is exposed to the drum charger 12 when the drum charger 12 is turned off, passes the position at which the image development operation is conducted. At this time, the development AC and DC biases and the development motor 15 are turned off. From this time period, the mark sensor 31 is in an operative mode for detecting the register marks 30x and 30y of the intermediate image transfer belt 16. Then, the intermediate image transfer belt 16 is further rotated so that the register mark 30x proceeds to a predetermined position after being detected by the mark sensor 31. At this time, the drum motor 24 and the quenching lamp are turned off. The ending sequence is conducted in this way.

Figure 7:
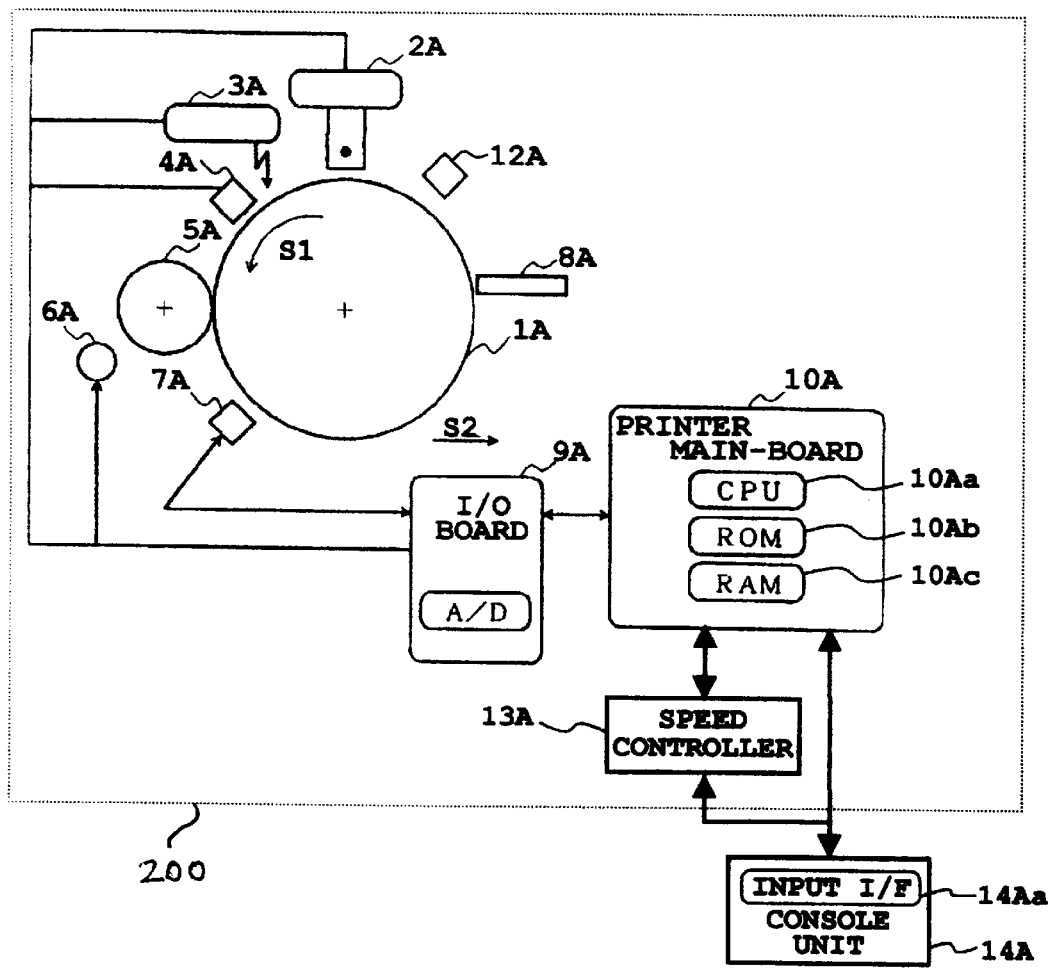
FIG. 7 is a block diagram for explaining an exemplary structure of a copying apparatus according to an embodiment of the second aspect of the present invention.

Referring now to the drawings corresponding to the second aspect of the invention, and more particularly to FIG. 7 thereof, there is illustrated a block diagram of an image forming mechanism of a copying apparatus 200 according to an embodiment of the second aspect of the present invention. The image forming mechanism of the copying apparatus 200 indicated in a dotted-line box shown in FIG. 7 includes various components in accordance with an electrophotographic image forming method which is known per se. These components include a drum-shaped photoconductor 1A at a center of the image forming mechanism. These components further include around the photoconductor 1A a scorotron-type drum charger 2A, an optical writing system 3A, a voltage sensor 4A, a development roller 5A, a toner supply unit 6A, a toner deposition sensor 7A, a cleaning mechanism 8A, and a quenching unit 12A. The image forming mechanism of the copying apparatus 200 further includes several electric circuit boards such as an I/O (Input and Output) board 9A which includes an A/D (analog-to-digital) converter, a printer main-board 10A for controlling an entire operation of the image forming mechanism, and a speed controller 13A for controlling changes of process line speeds in accordance with an instruction from an operator. The printer main-board 10A includes a CPU (central processing unit) 10Aa, a ROM (read only memory) 10Ab, and a RAM (random access memory) 10Ac. The RAM 10Ac is preferably a non-volatile type memory such as a flash memory, for example. As shown in FIG. 7, the copying apparatus 200 includes a console unit 14A which includes an input I/F (interface) 14Aa for allowing a user to input alphanumeric information to instruct a change of the process line speed, for example.

The image forming mechanism of the copying apparatus 200 is thus configured to perform an exemplary sequential image forming operation in accordance with the above-mentioned electrophotographic image forming method. In the exemplary sequential image forming operation, the photoconductor 1A is driven to rotate in the direction indicated by an arrow S1 shown in FIG. 7 at a process line speed which can be changed by the operator choice through the speed controller 13A, as described above. Such a process line speed may be set to 150 mm/s, for example.

Along with one rotation of the photoconductor 1A, series of operations are sequentially performed in the following manner. First, the surface of the photoconductor 1A is charged by the drum charger 2A. The optical writing system 3A then conducts an optical writing operation relative to the charged surface of the photoconductor 1A so as to generate an electrostatic latent image thereon. The development roller 5A which is supplied with toner on the surface thereof by the toner supply unit 6A discharges toner particles onto the electrostatic latent image formed on the photoconductor 1A so as to visualize the image with toner. The visualized toner image formed on the photoconductor 1A is then transferred onto a transfer sheet which is being transferred in the direction indicated by an arrow S2. The toner which has not been transferred and remains on the photoconductor 1A is cleaned by the cleaning mechanism 8A. After that, the photoconductor 1A is subjected to a discharge by the quenching unit 12A.

In addition to the above-described sequential operation, the copying apparatus 200 adds operations of the voltage sensor 4A and the toner deposition sensor 7A. The voltage sensor 4A is located at a position immediately next to a position where an image forming operation by exposure is performed, and detects a voltage $V_L$ of the electrostatic latent image formed through the image forming operation. Then, the toner deposition sensor 7A, which is a reflection type optical sensor, detects an amount $M_T$ of toner deposited on the photoconductor 1A. The results of these detecting operations are sent to the I/O board 9A.

Figure 8:
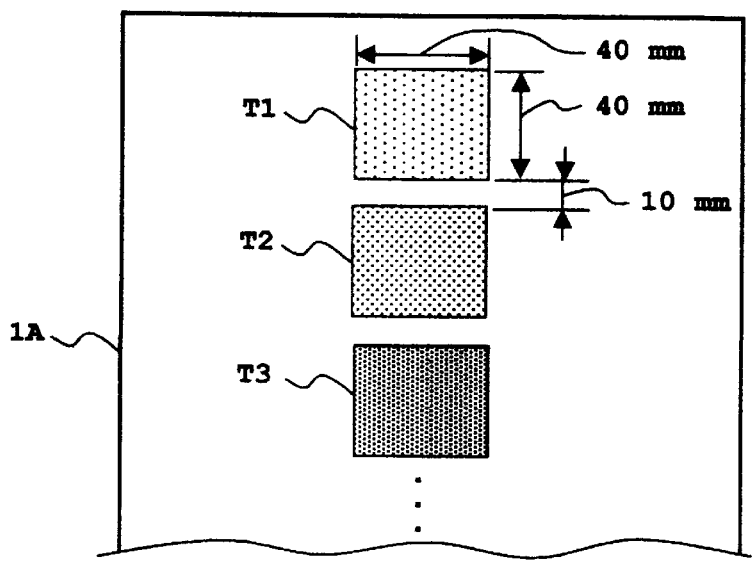
FIG. 8 is an illustration for explaining 16 gray-scale image patterns T1–T16 which will be formed during a $V_G/L_D$ adjusting operation on a photoconductor of the copying apparatus of FIG. 7.

The copying apparatus 200 according to the embodiment of the present invention is configured to perform a $V_G/L_D$ adjusting operation, wherein $V_G$ and $L_D$ stand for a grid voltage of the drum charger 2A and a laser power of the optical writing system 3A, respectively. When the copying apparatus 200 performs the $V_G/V_L$ adjusting operation, the optical writing operation performed by the optical writing system 3A forms 16 test patterns T1–T16 of predetermined stepwise-gray-scale on the photoconductor 1A, for example, as illustrated in FIG. 8, wherein each pattern is of about 40 mm square, for example, and there is a distance of about 10 mm between two adjacent patterns. Corresponding to these 16 test patterns T1–T16, information of 16 desired toner deposition amounts D1–D16 in unit of mg/cm$^2$ are previously stored in the RAM 10Ac.

As described above, the voltage sensor 4A and the toner deposition sensor 7A detect the respective values $V_L$ and $M_T$ corresponding to each one of the 16 predetermined stepwise-gray-scale test patterns T1–T16. The circuits of the I/O board 9A process the above-mentioned values through the A/D conversion and send the processed values to the printer main-board 10A. Then, the CPU 10Aa of the printer main-board 10A correlates the detected amount of toner deposition to the detected development potential, as illustrated graphically in FIG. 9A. These processed values are respectively referred to as P1–P16. These 16 points P1–P16 are based on the detected values of $V_L$ and $M_T$ corresponding to each of the 16 test patterns T1–T16.

Mostly, the values $M_T$ exhibited on the test pattern which have a toner density closer to saturation do not appear to be proportional to the changes of $V_L$. For example, the plotted points P13–P16 do not seemingly fit the line formed by the plotted points P1–P10, as illustrated in FIG. 9B. This is due to the characteristic of the reflection type toner deposition sensor 7A. Therefore, this embodiment disregards the plotted points P1–P16. Accordingly, the CPU 10Aa performs a gamma line calculation operation based on the 10 plotted points P1–P10 to obtain an approximate line which is expressed by the formula (y=−ax+−b), wherein Y represents $M_T$, x represents $V_L$, and a and b represent respective constants. Then the gamma line calculation operation defines the obtained approximate line as an approximate gamma line A, as shown in FIG. 9B.

After obtaining the approximate gamma line, the CPU 10Aa seeks a desired development potential V(n) corresponding to each of the desired toner deposition amounts D1–D16 stored in the RAM 10Ac, using the approximate gamma line. In this example, the CPU 10Aa disregards the values D11–D16 and uses the values D1–D10 due to the same reason as described above. When seeking a desired development potential, the CPU 10Aa determines an intersection of the gamma line A and each of the values D1–D10. For example, an intersection X is obtained in a case of D10, as shown in FIG. 9B. As a result, the CPU 10Aa can determine a desired development potential V10. In this way, the CPU 10Aa can determine a set of desired development potentials V1–V10 which will then be stored in the RAM 10Ac.

The RAM 10Ac also stores a plurality of information tables each including a series of, for example, 10 development potentials V respectively accompanied with values of a charge level $V_D$ of the photoconductor 1A, the voltage $V_L$ of the electrostatic latent image, and a development bias voltage $V_B$. Values of a series of 10 development potentials V included in each information table are configured to be different from those of other information tables. One example of such an information table is shown in FIG. 10. In this embodiment being explained, each information table stored in the RAM 10Ac includes ten development potentials, as illustrated in FIG. 10, to correspond to the desired development potentials V1–V10 which have been obtained in the way as described above with reference to FIG. 9B. These values of V, $V_D$, $V_L$, and $V_B$ in each table are determined based on a great number of experimental results. However, it is also possible for the user to generate an additional information table similar to that of FIG. 10 by inputting alphanumeric information through the console unit 14A. Alternatively, it is also possible for the user to change the information table selected by the CPU 10Aa to another table by inputting an instruction through the console unit 14A. In this case, most average users may preferably use instructions for simply darkening or lightening an image but not for selecting the actual tables.

Among the above-described information tables, the CPU 10Aa seeks one table in which the 10 development potentials V are the closest to the desired development potentials V1–V10 which have been stored in the RAM 10Ac, and then selects this information table. After selecting the information table, the CPU 10Aa performs detection of the grid voltage $V_G$ and the laser power $L_D$ and then stores the detected values in the RAM 10Ac. Then, the CPU 10Aa controls the drum charger 2A and the optical writing system 3A to vary $V_G$ and $L_D$ to the extent such that actual charge levels on the photoconductor 1A become nearly equal to those in the selected information table. In this operation, checking of the actual charge level may be performed by varying each of $V_G$ and $L_D$ in a stepwise manner, each by a relatively small predetermined value. When the actual charge levels on the photoconductor 1A become nearly equal to those in the selected information table, the CPU 10Aa stores the then-applied values of $V_G$ and $L_D$ as $V_{G1}$ and $L_{D1}$, respectively, for the process line speed of 150 mm/s.

Once $V_{G1}$ and $L_{D1}$ are defined in this way, the CPU 10Aa will use $V_{G1}$ and $L_{D1}$ stored in the RAM 10Ac when the process line speed is set to 150 mm/s, to maintain the charge levels on the photoconductor 1A nearly equal to the desired levels, thereby assuring production of images of a superior quality at the process line speed of 150 mm/s. Upon completing the $V_G$ and $L_D$ adjusting operation for the process line speed of 150 mm/s, the CPU 10Aa changes the process line speed to 100 mm/s, and proceeds to the same operations for detecting the grid voltage $V_G$ and the laser power $L_D$, as described above, and then stores the detected values in the RAM 10Ac. Then, the CPU 10Aa controls the drum charger 2A and the optical writing system 3A to vary $V_G$ and $L_D$ such that actual charge levels on the photoconductor 1A become nearly equal to those in the selected information table. In this operation, checking of the actual charge level may be performed by varying each of $V_G$ and $L_D$ in a stepwise manner, each by a relatively small predetermined value. When the actual charge levels on the photoconductor 1A become nearly equal to those in the selected information table, the CPU 10Aa stores the then-applied values of $V_G$ and $L_D$ as $V_{G2}$ and $L_{D2}$, respectively, for the process line speed of 100 mm/s.

Once $V_{G2}$ and $L_{D2}$ are defined in this way, the CPU 10Aa will use $V_{G2}$ and $L_{D2}$ stored in the RAM 10Ac when the process line speed is set to 100 mm/s, to maintain the charge levels on the photoconductor 1A nearly equal to the desired levels, thereby assuring production of images of a superior quality at the process line speed of 100 mm/s.

Next, an exemplary procedure of the $V_G$ and $L_D$ adjusting operation by the copying apparatus 200 according to the embodiment of the present invention will be explained with reference to a flowchart of FIGS. 11A and 11B. The copying apparatus 200 performs the $V_G$ and $L_D$ adjusting operation at each power-on time or intervals of a predetermined time period, or every time a predetermined number of copies are generated.

Figure 11A:
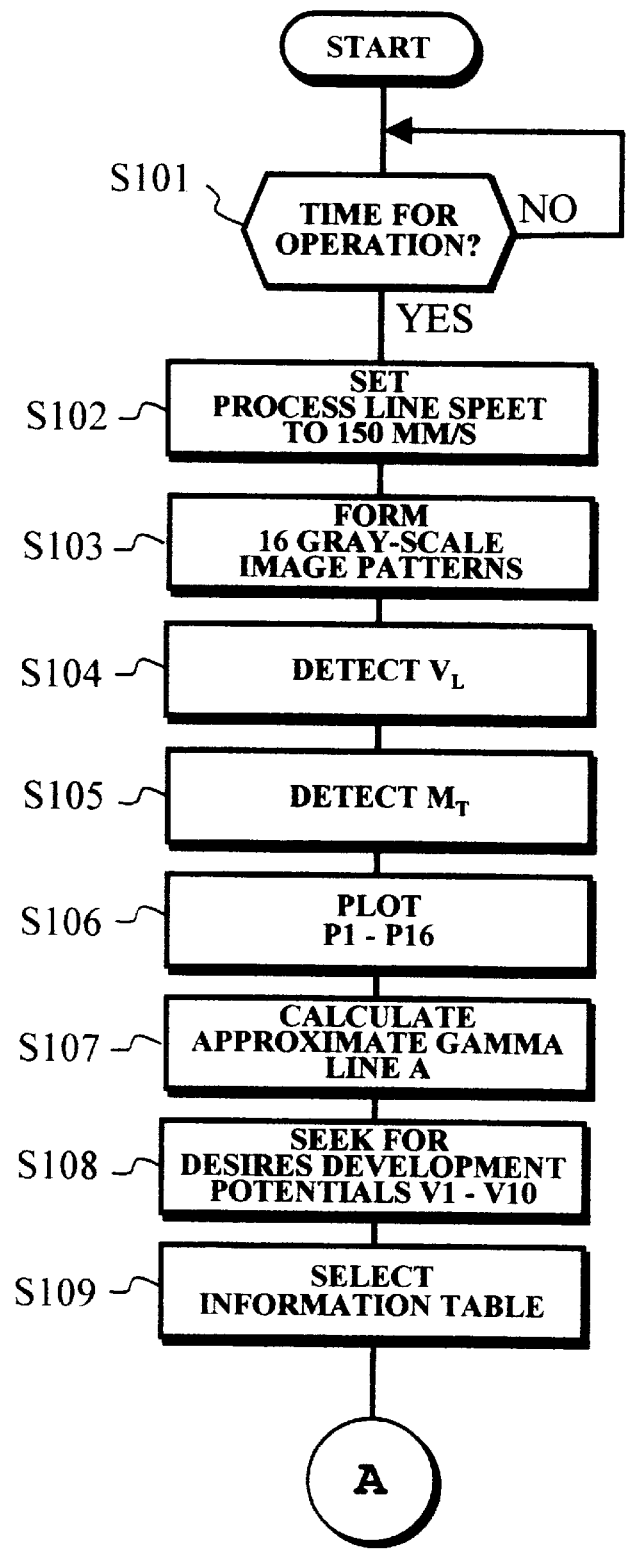
FIGS. 11A and 11B are a flowchart for explaining an exemplary procedure of the $V_G/L_D$ adjusting operation performed by the copying apparatus of FIG. 7.
Figure 11B:
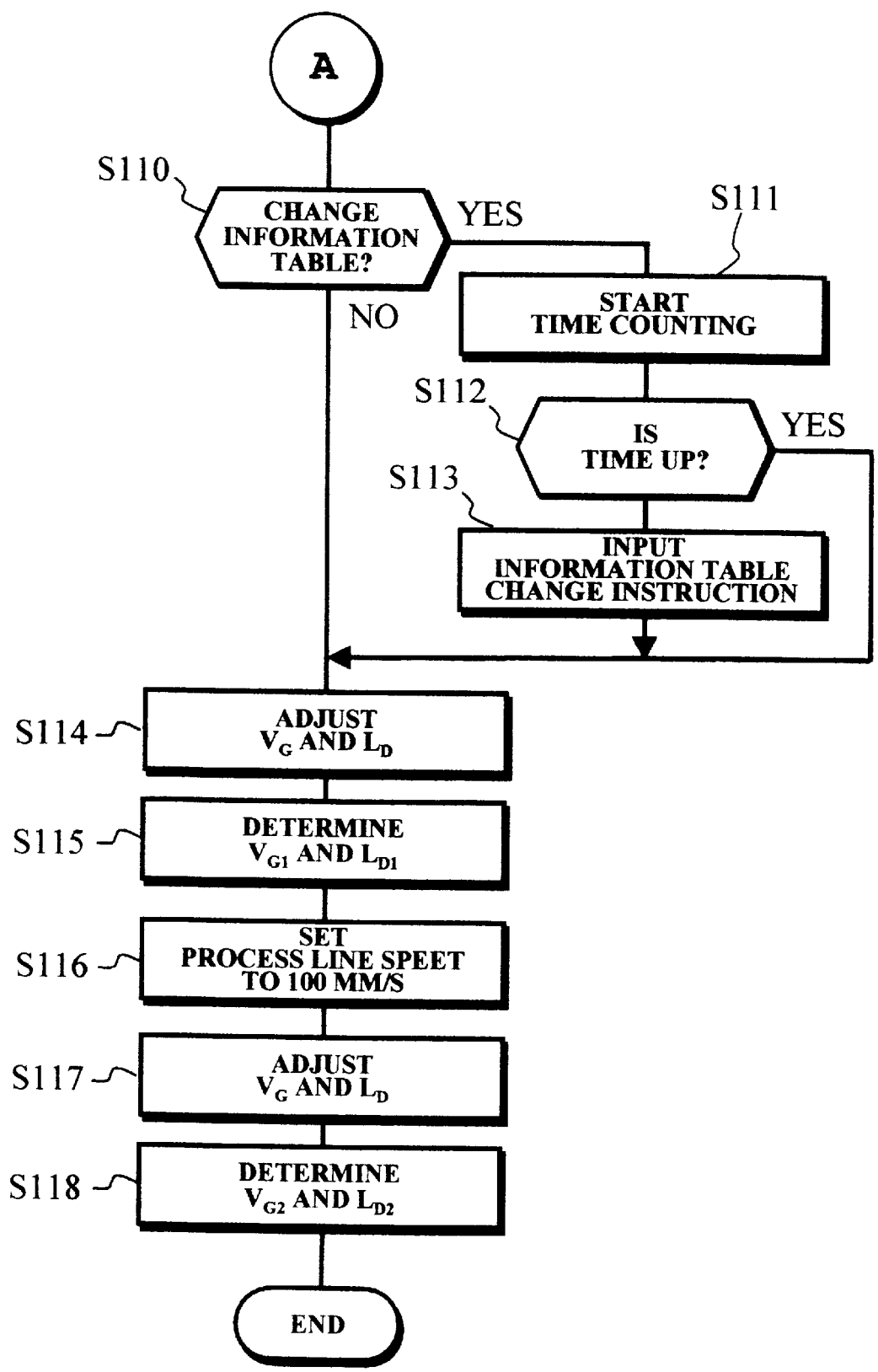

In Step S101 of FIG. 11A, the CPU 10Aa checks if it is the power-on time or it exceeds a predetermined time period or a predetermined number of copies are generated. When one of these events occurs, the CPU 10Aa proceeds to Step S102 in which the CPU 10Aa starts to rotate the photoconductor 1A at a process line speed of 150 mm/s, charges the photoconductor 1A with the drum charger 2A, and applies a development bias to the development roller 5A. In Step S103, the CPU 10Aa writes the 16 gray-scale image patterns T1–T17 on the photoconductor 1A with the optical writing system 3A.

In Step S104, the CPU 10Aa instructs the voltage sensor 4A to read the voltage levels $V_L$ of the electrostatic latent image formed on the surface of the photoconductor 1A, in correspondence to the 16 gray-scale image patterns T1–T17. The read voltage levels $V_L$ will then be stored in the RAM 10Ac. In Step S105, the CPU 10Aa instructs the toner deposition sensor 7A to read the toner deposition amount $M_T$ deposited on the surface of the photoconductor 1A, in correspondence to the 16 gray-scale image patterns T1–T17. The read toner deposition amount $M_T$ will then be stored in the RAM 10Ac. In Step S106, the CPU 10Aa correlates these detected values using $V_L$ and $M_T$, thereby obtaining the 16 points P1–P16 as shown in FIG. 9A.

Figure 9A:
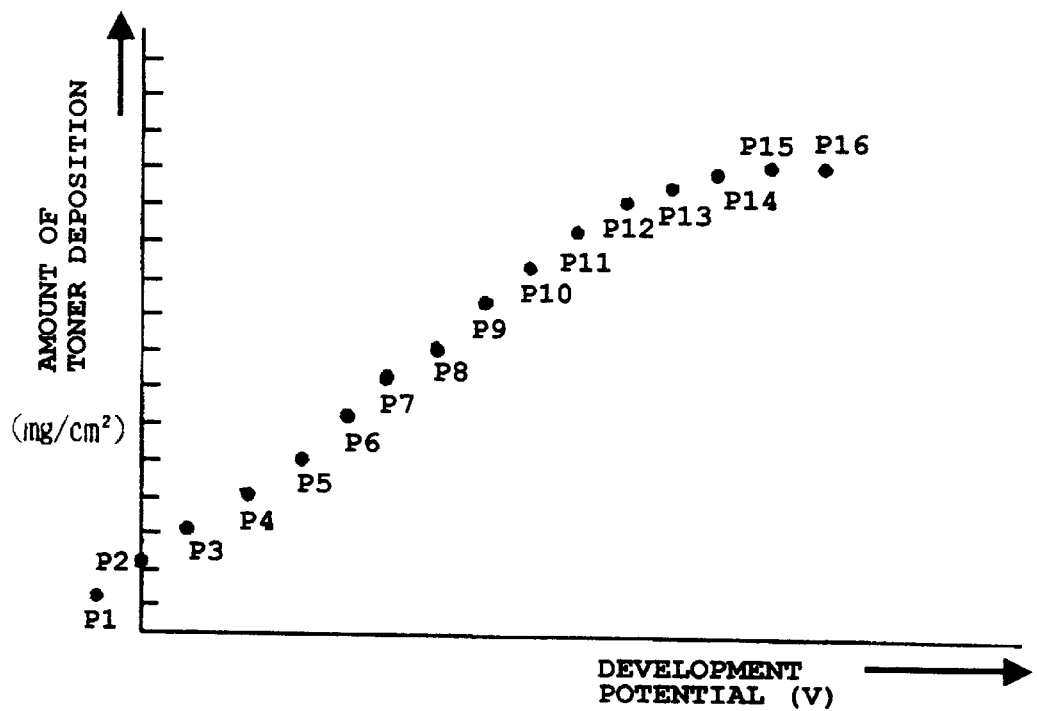
FIG. 9A is a graph demonstrating 16 plotted points P1–P16 based on each 16 values of $V_L$ and $M_T$ in corresponding to T1–T16.
Figure 9B:
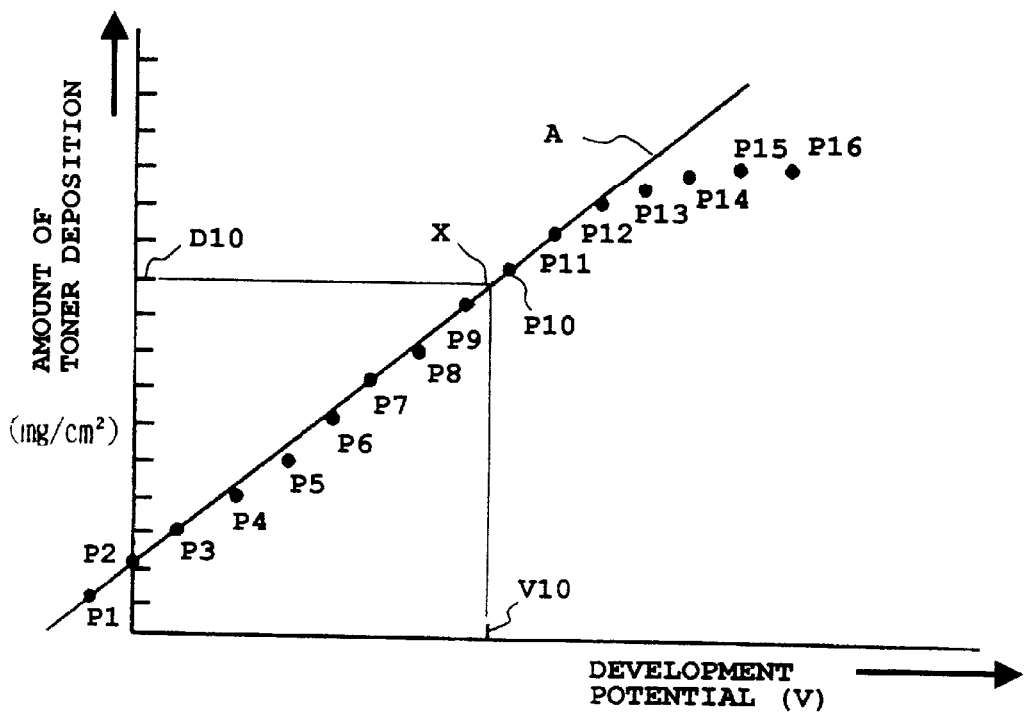
FIG. 9B is a graph demonstrating a relationship between P1–P16 and an approximate gamma line A.

Then, in Step S107, the CPU 10Aa calculates the approximate gamma line A, as shown in FIG. 9A, based on the plotted points P1–P10. Upon obtaining the approximate gamma line A, the CPU 10Aa proceeds to Step S108 to seek for the desired development potentials V1–V10 corresponding to the 10 intersection points of the desired toner deposition amounts D1–D10 and the approximate gamma line A. The desired development potentials V1–V10 are stored in the RAM 10Ac, also in Step S108.

In Step S109, the CPU 10Aa selects the one information table whose 10 development potentials V are the closest to the desired development potentials V1–V10 which have been stored in the RAM 10Ac in Step S108. Then, in Step S110 of FIG. 11B, the CPU 10Aa checks, through the display of the console unit 14A, to determine if the user desires to change the information table. A predetermined time period such as 3 minutes, for example, is counted in Steps S111 and S112 so as to check if the user properly respond by, in Step S 113, inputting an appropriate alphanumeric information representing an information table change instruction through the console unit 14A within the predetermined time period. The CPU 10A$a$ accepts an information table change instruction sent from the user when the user inputs the instruction within the predetermined time.

Then, in Step S114, the CPU 10A$a$ performs detection of the grid voltage $V_G$ of the scorotron-type drum charger 2A and the laser power $L_D$ of the optical writing system 3A, and then stores the detected values in the RAM 10A$c$. Subsequently, also in Step S114, the CPU 10A$a$ controls the drum charger 2A and the optical writing system 3A to vary $V_G$ and $L_D$ to the extent such that actual charge levels on the photoconductor 1A become nearly equal to those in the selected information table. When the actual charge levels on the photoconductor 1A become nearly equal to those in the selected information table, the CPU 10A$a$ proceeds to Step S115 in which the CPU 10A$a$ determines that the then-applied values of $V_G$ and $L_D$ are used for the process line speed of 150 mm/s and stores the same values of $V_G$ and $L_D$ as $V_{G1}$ and $L_{D1}$, respectively, into the RAM 10A$c$.

Upon completing the $V_G$ and $L_D$ adjusting operation for the process line speed of 150 mm/s, the CPU 10A$a$ proceeds to Step S116 to change the process line speed to 100 mm/s, and performs in Step S117 the same operations for detecting the grid voltage $V_G$ and the laser power $L_D$ of Step S114, and then stores the detected values in the RAM 10A$c$. Then, also in Step S117, the CPU 10A$a$ controls the drum charger 2A and the optical writing system 3A to vary $V_G$ and $L_D$ to the extent such that actual charge levels on the photoconductor 1A become nearly equal to those in the selected information table. When the actual charge levels on the photoconductor 1A become nearly equal to those in the selected information table, the CPU 10A$a$ determines in Step S118 that the then-applied values of $V_G$ and $L_D$ are used for the process line speed of 100 mm/s, and stores the same values of $V_G$ and $L_D$ as $V_{G2}$ and $L_{D2}$, respectively, in the RAM 10A$a$. The process then ends.

The invention may be conveniently implemented using a conventional general purpose digital computer programmed according to the teaching of the present specification, as will be apparent to those skilled in the computer art. Appropriate software coding can readily be prepared by skilled programmers based on the teachings of the present disclosure, as will be apparent to those skilled in the software art. The present invention may also be implemented by the preparation of application specific integrated circuits or by interconnecting an appropriate network of conventional component circuits, as will be readily apparent to those skilled in the art.

Obviously, numerous additional modifications and variations of the present invention are possible in light of the above teachings. It is therefore to be understood that within the scope of the appended claims, the present invention may be practiced otherwise than as specifically described herein.

This document is based on Japanese Patent Application Nos. JPAP10-125302, filed on Apr. 20, 1998, JPAP10-210922 filed on Jul. 27, 1998 and JPAP10-253645 filed on Sep. 8, 1998 in the Japanese Patent Office, the entire contents of which are hereby incorporated by reference.

What is claimed as new and is desired to be secured by Letters Patent of the United States is:

1. An image forming apparatus, comprising:
   an image carrying member configured to carry on a surface thereof an image formed by exposing said surface to a scanning laser beam in accordance with an image forming process;
   an intermediate image transfer member positioned to receive said image from said image carrying member, and transfer said image onto a recording sheet in accordance with an image transfer process;
   a memory which stores a plurality of values of selectable process line speeds A, each defining a speed of the image forming process performed on said image carrying member with the scanning laser beam in a sub-scanning direction, and a plurality of values of selectable process line speeds B, each defining a speed of the image transfer process; and
   a controller connected to control a speed of at least the image carrying member and the intermediate image transfer member such as to make a plurality of combinations of said process line speeds A and B by selecting one of said plurality of values of selectable process line speeds A and one of said plurality of values of selectable process line speeds B and controlling at least the image carrying member and the intermediate image transfer member according to the selected process line speeds.

2. An image forming apparatus as defined in claim 1, further comprising:
   a plurality of development mechanisms, each of which are configured to contain development agents and which are positioned to develop an image by making the developing agents contact said surface of said image carrying member; and
   a mechanism connected to said plurality of development mechanisms such as to set said plurality of development mechanisms at either of a first condition in which said development mechanisms cause the development agents to contact said surface of said image carrying member and a second condition in which said development mechanisms cause the development agents to come out of contact with said surface of said image carrying member,
   wherein said controller is constructed to control said mechanism to set each of said plurality of development mechanisms into said second condition when the process line speeds A and B are changing.

3. An image forming apparatus as defined in claim 1, wherein said plurality of combinations includes a combination in which said process line speed A is greater than said process line speed B.

4. An image forming apparatus as defined in claim 1, wherein said plurality of combinations includes a combination in which said process line speed A is smaller than said process line speed B.

5. An image forming apparatus, comprising:
   image carrying means for carrying on a surface thereof an image formed by exposing said surface to a scanning laser beam in accordance with an image forming process;
   intermediate image transfer means for receiving the image from said image carrying member, and for transferring the image onto a recording sheet in accordance with an image transfer process;
   memory means for storing a plurality of values of selectable process line speeds A, each defining a speed of the image forming process performed on said image carrying means with the scanning laser beam in a sub-scanning direction, and a plurality of values of selectable process line speeds B, each defining a speed of the image transfer process; and control means for controlling a speed of at least the image carrying means and the intermediate image transfer means such as to make a plurality of combinations of said process line speeds A and B by selecting one of said plurality of values of selectable process line speeds A and one of said plurality of values of selectable process line speeds B and for controlling at least the image carrying means and the intermediate image transfer means according to the selected process line speeds.

6. An image forming apparatus as defined in claim 5, further comprising:

a plurality of development means for developing an image by making developing agents contact said surface of said image carrying means; and means for setting said plurality of development means at either of a first condition in which said development means cause the development agents to contact said surface of said image carrying means and a second condition in which said development means cause the development agents to come out of contact with said surface of said image carrying means, wherein said control means comprises means for setting each of said plurality of development means into said second condition when the process line speeds A and B are changing.

7. An image forming apparatus as defined in claim 5, wherein said plurality of combinations includes a combination in which said process line speed A is greater than said process line speed B.

8. An image forming apparatus as defined in claim 5, wherein said plurality of combinations includes a combination in which said process line speed A is smaller than said process line speed B.

9. An image forming process, comprising the steps of:

forming an image on a surface of an image carrying member by exposing said surface to a scanning laser beam;

transferring the image onto an intermediate image transfer member;

transferring the image onto a recording sheet;

selecting a combination of process line speeds A and B by selecting one of the plurality of values of selectable process line speeds A and one of said plurality of values of selectable process line speeds B, wherein the selectable process line speeds A each define a speed of the image forming step in a sub-scanning direction, and the selectable process line speeds B each define a speed of the image transfer steps; and controlling at least the image carrying member and the intermediate image transfer member according to the selected process line speeds.

10. An image forming process as defined in claim 9, further comprising:

a plurality of development mechanisms, each of which are configured contain development agents and which are positioned to develop an image by making the developing agents contact said surface of said image carrying member; and setting, when the process line speeds A and B are changing, a plurality of development mechanisms containing development agents at either of a first condition in which said development mechanisms cause the development agents to contact said surface of said image carrying member and a second condition in which said development mechanisms cause the development agents to come out of contact with said surface of said image carrying member.

11. An image forming process as defined in claim 9, wherein said plurality of combinations includes a combination in which said process line speed A is greater than said process line speed B.

12. An image forming process as defined in claim 9, wherein said plurality of combinations includes a combination in which said process line speed A is smaller than said process line speed B.

13. An image forming apparatus, comprising:

a photoconductor member configured to be driven in a plurality of process line speeds;

a voltage sensor positioned to detect a voltage on a surface of said photoconductor member;

a toner deposition sensor positioned to detect an amount of toner deposited on said surface of said photoconductor member;

a charging member positioned to provide a charge onto said surface of said photoconductor member;

a grid adjusting member which controls a grid voltage of said charging member;

a laser exposure unit which generates a laser beam modulated in accordance with an image signal and which is positioned to expose said surface of said photoconductor member to said laser beam;

an exposure adjusting member which adjusts an amount of a laser beam exposure from said laser exposure unit;

a development gamma obtaining member which obtains a development gamma line by performing a sequential operation including the steps of forming an electrostatic latent image including a plurality of patterns on said surface of said photoconductor member; reading the voltages of said plurality of patterns with said voltage sensor; developing said electrostatic latent image with toner; reading the amount of toner deposited on said plurality of patterns with said toner deposition sensor; and performing a predetermined operation to obtain said development gamma line;

a reference table which includes information to determine appropriate values of a voltage level on said surface of said photoconductor member, a development bias, and an after-exposure voltage on said surface of said photoconductor member, in accordance with said development gamma line obtained with said development gamma obtaining member; and a controller which detects the voltage on said surface of said photoconductor member rotating in each of said process line speeds and determines optimum values of said grid voltage of said charging member and said amount of said laser beam exposure from said laser exposure unit to obtain the respective required voltage level used by said grid adjusting member, and said after-exposure voltage used by said exposure adjusting member, on the basis of said detected voltage and with reference to said information included in said reference table.

14. The image forming apparatus as defined in claim 13, further comprising an input member which allows an arbitrary value to be input into said reference table.

15. An image forming apparatus, comprising:

a photoconductor configured to be driven in a plurality of process line speeds;

voltage sensing means for detecting a voltage on a surface of said photoconductor member;

toner deposition sensor means for detecting an amount of toner deposited on said surface of said photoconductor member;

charging means for providing a charge onto said surface of said photoconductor member;

a grid adjusting means for controlling a grid voltage of said charging means;

laser exposure means for generating a laser beam modulated in accordance with an image signal and for exposing said surface of said photoconductor member to said laser beam;

exposure adjusting means for adjusting an amount of a laser beam exposure from said laser exposure means;

development gamma obtaining means for obtaining a development gamma line by performing a sequential operation including the steps of forming an electrostatic latent image including a plurality of patterns on said surface of said photoconductor member; reading the voltages of said plurality of patterns with said voltage sensing means; developing said electrostatic latent image with toner; reading the amount of toner deposited on said plurality of patterns with said toner deposition sensor means; and performing a predetermined operation to obtain said development gamma line;

reference means for determining appropriate values of a voltage level on said surface of said photoconductor member, a development bias and an after-exposure voltage on said surface of said photoconductor member, in accordance with said development gamma line obtained with said development gamma obtaining means; and controller means for detecting the voltage on said surface of said photoconductor member rotating in each of said process line speeds and for determining optimum values of said grid voltage of said charging means and said amount of said laser beam exposure from said laser exposure means to obtain the respective required voltage level used by said grid adjusting means, and said after-exposure voltage used by said exposure adjusting means, on the basis of said detected voltage and with reference to said information included in said reference means.

16. The image forming apparatus as defined in claim 15, further comprising input means for inputting an arbitrary value into said reference table.

17. An image forming process, performed by an image forming apparatus comprising a photoconductor member configured to be driven in a plurality of process line speeds; a voltage sensor positioned to detect a voltage on a surface of said photoconductor member; a toner deposition sensor positioned to detect an amount of toner deposited on said surface of said photoconductor member; a charging member positioned to provide a charge onto said surface of said photoconductor member; a grid adjusting member which controls a grid voltage of said charging member; a laser exposure unit which generates a laser beam modulated in accordance with an image signal and which is positioned to expose said surface of said photoconductor member to said laser beam; an exposure adjusting member which adjusts an amount of a laser beam exposure from said laser exposure unit; a development gamma obtaining member which obtains a development gamma line by performing a sequential operation including the steps of forming an electrostatic latent image including a plurality of patterns on said surface of said photoconductor member; reading the voltages of said plurality of patterns with said voltage sensor; developing said electrostatic latent image with toner; reading the amount of toner deposited on said plurality of patterns with said toner deposition sensor; and performing a predetermined operation to obtain said development gamma line; a reference table which includes information to determine appropriate values of a voltage level on said surface of said photoconductor member, a development bias, and an after-exposure voltage on said surface of said photoconductor member, in accordance with said development gamma line obtained with said development gamma obtaining member; and a controller, the process comprising the steps of:

using said voltage sensor to detect a voltage on a surface of said photoconductor member;

using said toner deposition sensor to detect an amount of toner deposited on said surface of said photoconductor member;

using said charging member to provide a charge onto said surface of said photoconductor member;

using said grid adjusting member to control a grid voltage of said charging member;

using said laser exposure unit to generate a laser beam modulated in accordance with an image signal and which is positioned to expose said surface of said photoconductor member to said laser beam;

using said exposure adjusting member to adjust an amount of a laser beam exposure from said laser exposure unit;

using said development gamma obtaining member to obtain a development gamma line by performing a sequential operation including the steps of forming an electrostatic latent image including a plurality of patterns on said surface of said photoconductor member; reading the voltages of said plurality of patterns with said voltage sensor; developing said electrostatic latent image with toner; reading the amount of toner deposited on said plurality of patterns with said toner deposition sensor; and performing a predetermined operation to obtain said development gamma line; and using the controller to detect the voltage on said surface of said photoconductor member rotating in each of said process line speeds and to determine optimum values of said grid voltage of said charging member and said amount of said laser beam exposure from said laser exposure unit to obtain the respective required voltage level used by said grid adjusting member, and said after-exposure voltage used by said exposure adjusting member, on the basis of said detected voltage and with reference to said information included in said reference table.

18. The image forming process as defined in claim 17, further comprising inputting an arbitrary value into said reference table.

* * * * *